United States Patent
Stefan et al.

(10) Patent No.: US 10,137,885 B2
(45) Date of Patent: Nov. 27, 2018

(54) METHOD AND DEVICE FOR OPERATING A MOTOR VEHICLE

(71) Applicant: FORD GLOBAL TECHNOLOGIES, LLC, Dearborn, MI (US)

(72) Inventors: Frederic Stefan, Aachen (DE); Alain Marie Roger Chevalier, Henri-Chapelle (BE); Evangelos Bitsanis, Aachen (DE); Michael Marbaix, Haillot (BE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/265,347

(22) Filed: Sep. 14, 2016

(65) Prior Publication Data

US 2017/0072944 A1    Mar. 16, 2017

(30) Foreign Application Priority Data

Sep. 15, 2015 (DE) .................. 10 2015 217 602

(51) Int. Cl.
| | |
|---|---|
| *B60W 20/20* | (2016.01) |
| *B60W 30/182* | (2012.01) |
| *G01C 21/34* | (2006.01) |
| *G01C 21/36* | (2006.01) |
| *B60K 6/20* | (2007.10) |

(52) U.S. Cl.
CPC .......... *B60W 20/20* (2013.01); *B60W 30/182* (2013.01); *G01C 21/3469* (2013.01); *G01C 21/3605* (2013.01); *G01C 21/3691* (2013.01); *G01C 21/3697* (2013.01); *B60K 6/20* (2013.01); *B60W 2550/12* (2013.01); *B60W 2550/402* (2013.01); *B60W 2710/06* (2013.01); *B60W 2710/08* (2013.01); *B60Y 2200/92* (2013.01);

(Continued)

(58) Field of Classification Search
CPC .. B60W 20/20; B60W 30/182; G01C 21/3469
See application file for complete search history.

(56) References Cited

U.S. PATENT DOCUMENTS

| | | |
|---|---|---|
| 6,944,532 B2 | 9/2005 | Bellinger |
| 8,095,290 B2 | 1/2012 | Smyth et al. |

(Continued)

FOREIGN PATENT DOCUMENTS

| | | |
|---|---|---|
| DE | 102007053279 A1 | 5/2009 |
| DE | 102009035103 A1 | 4/2010 |

(Continued)

OTHER PUBLICATIONS

German Search Report for German Application No. 10 2015 217 602.9 dated Jul. 14, 2016.

(Continued)

*Primary Examiner* — Basil T. Jos
(74) *Attorney, Agent, or Firm* — Frank MacKenzie; Brooks Kushman P.C.

(57) ABSTRACT

A system and method for operating a vehicle having different operating modes affecting emissions include activating, by a vehicle controller, at least one of the different operating modes affecting emissions selected in response to an estimated population density of a designated area associated with a current location or an anticipated future location of the vehicle.

12 Claims, 3 Drawing Sheets

(52) U.S. Cl.
CPC ..... *B60Y 2300/182* (2013.01); *B60Y 2300/24* (2013.01); *Y10S 903/903* (2013.01)

(56) References Cited

U.S. PATENT DOCUMENTS

| | | |
|---|---|---|
| 8,612,273 B2 | 12/2013 | Johnson |
| 8,918,240 B2 | 12/2014 | Manickaraj et al. |
| 9,631,528 B2 | 4/2017 | Bradley et al. |
| 2014/0277878 A1* | 9/2014 | Manickaraj ........... B60W 20/00 701/22 |
| 2014/0379170 A1 | 12/2014 | Muetzel et al. |

FOREIGN PATENT DOCUMENTS

| | | |
|---|---|---|
| DE | 102013223331 A1 | 5/2015 |
| EP | 2151362 A1 | 2/2010 |

OTHER PUBLICATIONS

Libelium Comunicaciones Distribuidas S.L.; Meshlium Xtreme Data Sheet; 3 pps.; Nov. 2014; Doc. Version v4A.

* cited by examiner

METHOD AND DEVICE FOR OPERATING A MOTOR VEHICLE

CROSS-REFERENCE TO RELATED APPLICATIONS

This application claims foreign priority benefits under 35 U.S.C. § 119(a)-(d) to DE 10 2015 217 602.9 filed Sep. 15, 2015, which is hereby incorporated by reference in its entirety.

TECHNICAL FIELD

This disclosure relates to a method and a device for operating a motor vehicle, wherein different operating modes for reducing emissions can be activated in the motor vehicle.

BACKGROUND

Motor vehicles that are driven by means of an internal combustion engine contribute to reduced air quality, particularly in densely populated areas such as for example inner cities. The effects of vehicle emissions have been widely reported. In some areas, air quality varies at certain times.

Various measures are employed to reduce vehicle emissions. On the one hand, methods for reducing the vehicle emissions are continually being developed and implemented to meet the respectively applicable exhaust standards. On the other hand, measures are also taken to limit the vehicle density in areas that are particularly affected by air quality issues. Thus for example, on reaching certain low air quality values, the license plates for certain vehicles (for example those with odd numbered or with even-numbered license plates) can be restricted. In other cases, access to certain urban areas for vehicles that do not meet the current exhaust standards is prohibited.

SUMMARY

A method for operating a motor vehicle, wherein different operating modes for reducing emissions can be activated in the motor vehicle, may include estimating a population density in at least one area, wherein the population density indicates the density of persons currently present in the area based on the detection of persons in the area, and adjusting a strategy for activating at least one of the operating modes based on the result of said estimation.

Various embodiments of the claimed subject matter are based on the concept of estimating the population density or the people density and the development thereof in at least one area (also referred to as an "estimation area" below), which for example lies in the surroundings of the current vehicle position, and suitably adjusting the activation of certain operating modes of the drive train to reduce emissions.

In one or more embodiments it is assumed that the relevant motor vehicle in which the method is implemented is fitted with a suitable location device for position determination (for example a GPS system, a GSM antenna or an otherwise suitable vehicle infrastructure). The estimation of the population density or the people density can for example be carried out on a cloud basis, wherein a central server collects the corresponding information and sends it to the motor vehicle. In other embodiments, the estimation of the population density or the people density can also be implemented in the motor vehicle itself as an embedded solution.

The estimation of the population density or the people density may also be carried out by determining the positions of individuals within a certain (estimation) area anonymously, wherein for example smartphone-based location can be carried out without private information being transmitted in doing so. In this case, an estimation area can be defined as an area or a zone of a certain shape and size (for example a circular disk with a certain radius), wherein centering can be carried out in relation to an arbitrary point along the route of the vehicle (for example the current vehicle position). In doing so, the shape of the zone involved can be variable and can be dynamically selected by the device.

The number of individuals recorded in the respective estimation area can be used as a measure of the population density or the people density. Moreover, the population dynamic can be determined for each estimation area. This enables the prediction of the development of the population density or the people density in certain estimation areas. Here a wide dynamic range can mean for example that the people density changes dramatically within a short time span.

According to one or more embodiments, different operating modes for reducing emissions are set in relation to the population density in a predetermined estimation area, the size of the estimation area, the time spent by a vehicle in an estimation area, the estimated emissions in the current operating mode in a given estimation area, the energy expenditure and time expenditure for exiting the current operating mode and the transition to a predetermined emission reducing strategy as well as the estimated emissions for a predetermined emission reducing mode. Thereby the corresponding suitable emission reducing strategy can be determined for each arbitrary estimation area. Thus for example, for a low population density it can be decided that the current emission operating mode is maintained.

According to one embodiment, in the population density estimation step the location of persons present in the area is carried out based on a wireless data transmission.

According to one embodiment, the population density estimation step is carried out for the area in which the motor vehicle is currently located.

According to one embodiment, the population density estimation step is carried out while the motor vehicle is moving, wherein the area for which the repeated estimation of the population density is carried out is updated on each occasion according to the current position of the motor vehicle.

According to one embodiment, a frequency with which said updating is carried out is selected depending on the operating state and/or the surroundings of the motor vehicle.

During the operation of the device according to one or more embodiments, a definition of the respective estimation areas can be carried out when centering on the respective current vehicle position, wherein the relevant center of the estimation area can be updated for example at a certain frequency. Said frequency can be defined in relation to the respective distance travelled or the elapsed travelling time. In further embodiments, the frequency can also be selected depending on the respective geographical zone (wherein for example in inner city traffic a more frequent updating of the estimation area can be carried out). Whenever an estimation area has been defined, a continuous estimation of the population density or the people density in said estimation area is carried out. The estimation of the population density or the people density is automatically halted if the vehicle leaves the area involved.

According to one embodiment, the step of estimating the population density is carried out for at least one area that the motor vehicle is expected to reach at a later point in time.

According to one embodiment, the step of estimating the population density is carried out for a number of areas that are disposed along an envisaged route of the motor vehicle.

In one or more embodiments, monitoring of the population density or the people density is thus also carried out in estimation areas that are disposed along the envisaged or probable vehicle trajectory (i.e. the path along which the vehicle is moving). The trajectory can for example be classified as envisaged if the driver enters the relevant destination into a navigation system. The monitoring of the population density or the people density in the areas ahead of the current vehicle position enables the population density or the people density along the route of the vehicle to be predicted. Using said prediction, it can be decided which mode for reducing emissions should be activated, and optimal planning of the transition from one operating mode to another operating mode can be carried out.

In one or more embodiments, with the prerequisite that the envisaged route of the vehicle is known, an estimation of the population density or the people density along the route of the vehicle can be predicted over a long period of time. In doing so, finally the combination of emission reduction modes can be selected that enables the maximum reduction of emissions at the same time as the minimum vehicle load as well as the minimum energy costs.

According to one embodiment, the step for adjusting a strategy for activating at least one of the operating modes is further carried out while taking into account the respective energy expenditure and/or time expenditure connected to a change of the operating mode.

Here for example it can be taken into account that transitions between certain operating modes are more complex or energy-intensive than between other operating modes, or that a certain operating mode is accompanied by increased wear or energy consumption in the event of excessively frequent changes.

According to one embodiment, the step of adapting a strategy for activating at least one of the operating modes is further carried out while taking into account the climatic conditions prevailing in the at least one area. Thus for example weather and environmental data provide a measure of how good the air circulation and emission dissipation are in a certain estimation area. In the embodiments, information about the current air quality in the involved estimation areas can also be received and taken into account by the device according to the invention.

According to one embodiment, the step of adjusting a strategy for activating at least one of the operating modes is further carried out while taking into account the number and/or type of emission sources (in particular exhaust gas emission sources) present in the at least one area, such as for example motor vehicles, trucks, factories and airports.

In at least one embodiment, a device for operating a motor vehicle includes different operating modes for reducing emissions that can be activated in the motor vehicle, wherein the device is configured to carry out a method with the previously described features. For advantages as well as representative configurations of the device, refer to the above descriptions in connection with the method embodiments.

The device according to one or more embodiments can be activated or deactivated at any time by the user or the driver. Furthermore, a notification to the user or driver regarding the current status of the device can be carried out at any time.

The claimed subject matter is described in detail below using representative embodiments with reference to the accompanying figures.

DETAILED DESCRIPTION

As required, detailed embodiments are disclosed herein; however, it is to be understood that the disclosed embodiments are merely representative and that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
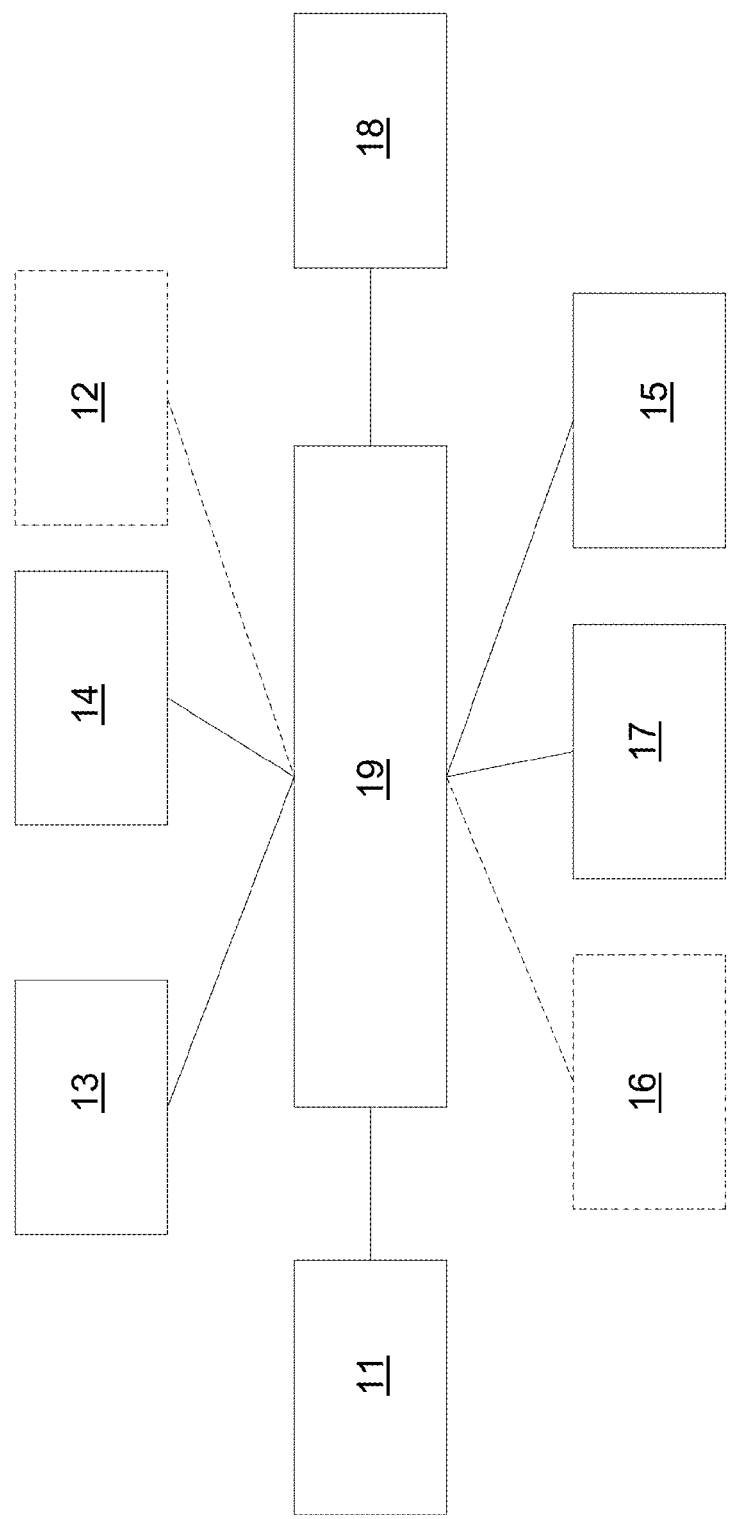
FIG. 1 shows a schematic overview of components or modules present in the device according to one embodiment.

FIG. 1 shows in a schematic representation an overview of components or modules present in a device according to one embodiment.

According to FIG. 1, a central logic module for the coordination of the operation of the components present is denoted by "19". An HMI module 11 (HMI="human machine interface") enables interactions on the part of the user or driver. A (optional) route planning module 12 can for example be configured as a navigation system. A GPS module 13 enables the geographical location of the vehicle.

A planning unit for planning estimation areas is denoted by "14". Said planning unit 14 defines the characteristic features (size, shape and center) of a current estimation area as well as future estimation areas. The planning unit 14 further determines the frequency at which the estimation areas are updated. Here the information that is provided by the route planning module 12 can be used to process or to determine the estimation areas along the envisaged route of the vehicle.

A module 15 for estimating the population density or the people density receives the positions and velocity vectors of persons located within a predetermined estimation area, wherein for example smartphone-based geographical location can be used. Here a plurality of areas can also be detected simultaneously. The velocity vectors describe the respective orientation and speed of motion of the persons and thus give information about the dynamics of the population density.

A prediction module 16 for predicting the population density or the people density is used to predict the population density or the people density in the estimation areas that the vehicle will probably reach after a certain period of time with knowledge of the route of the vehicle.

A classification module 17 for classification of the emission strategy is used to classify different emission strategies based on the current data and possibly predicted data using different parameters, for example the population density in a predetermined estimation area, the size of the estimation area, the period spent by a vehicle in an estimation area, the estimated emissions in the current operating mode in a given estimation area, the energy expended and time expended to exit the current operating mode and the transition to a predetermined emission reducing strategy as well as the estimated emissions for a predetermined emission reducing mode. Weather and the surroundings can provide a measure of how good the air circulation and emission dissipation are in a certain estimation area.

A planning module 18 for planning the drive train operation is used to determine and coordinate the activation of different emission operating modes along the route of the vehicle based on the data estimated with the modules 14-17.

Figure 2:
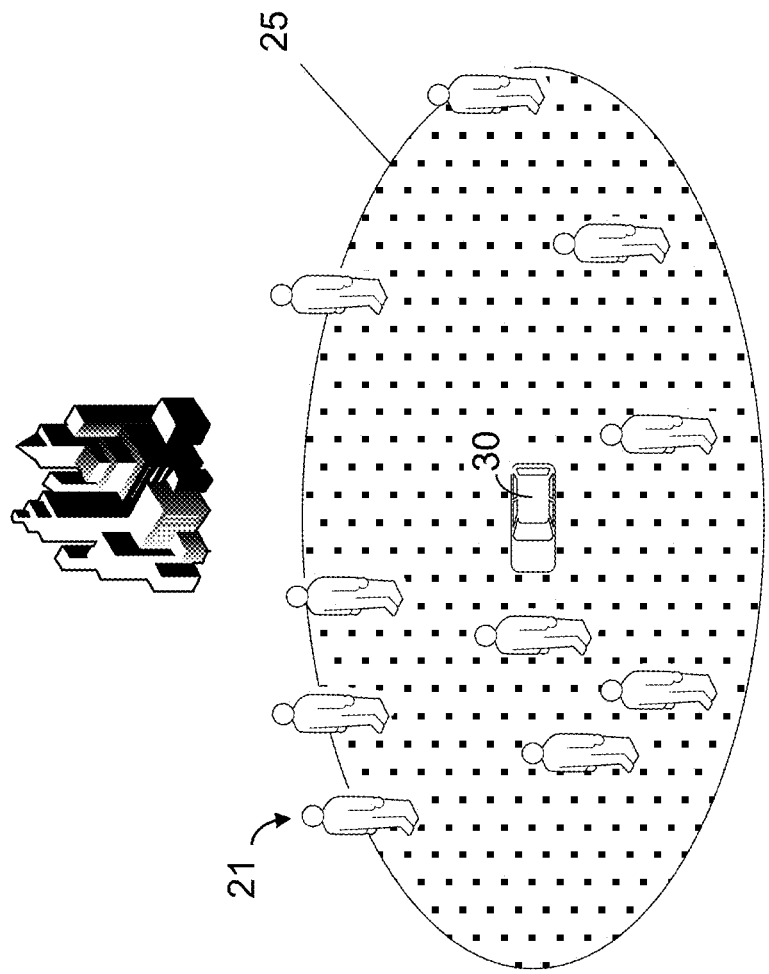
FIGS. 2 and 3 show schematic representations to illustrate different representative scenarios when carrying out the method according to one or more embodiments.
Figure 3:
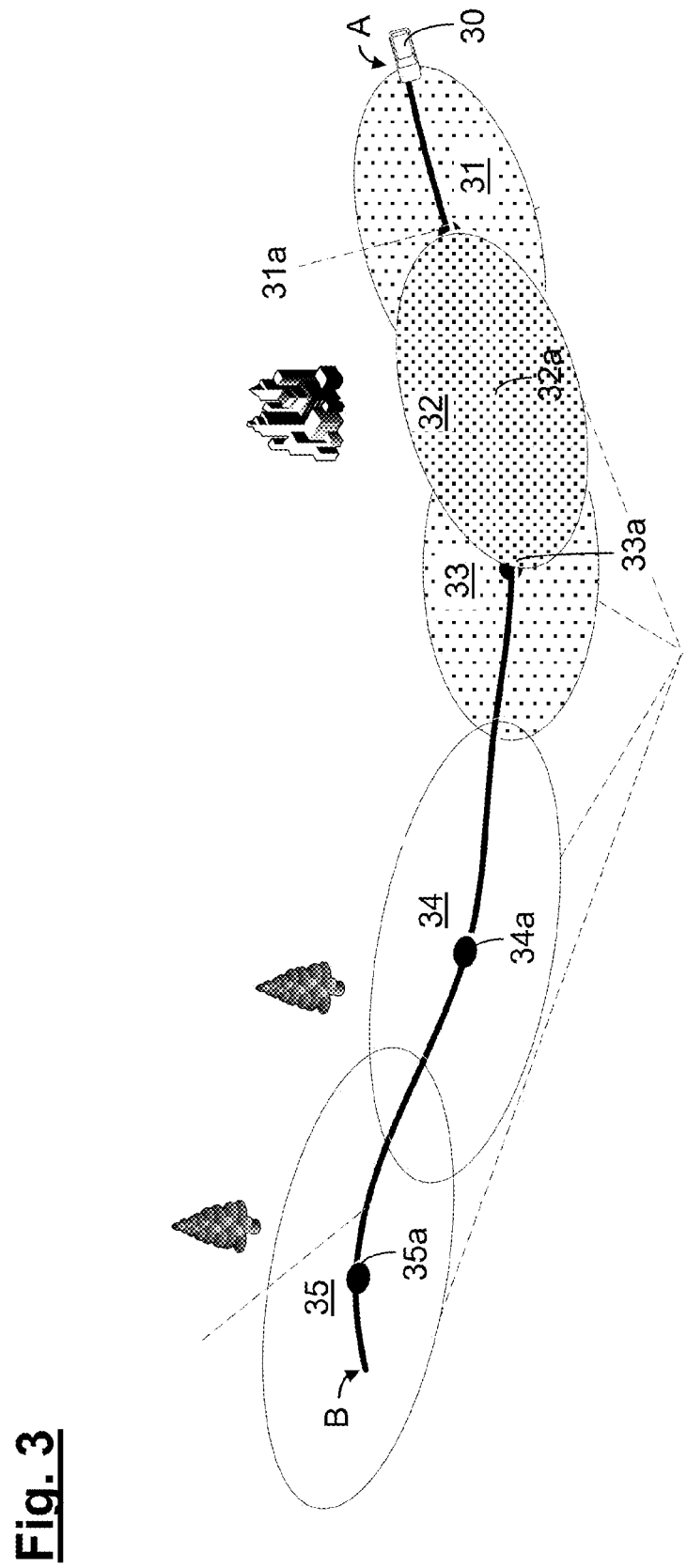

FIGS. 2 and 3 are used to illustrate different scenarios when carrying out the method according to one or more embodiments. According to FIG. 2, an estimation area is denoted by "25", and persons or individuals present in the estimation area 25 are denoted by "21". The current population density or people density in the surroundings of a motor vehicle 30 is continuously estimated based on the number of individuals 21 that are located in the estimation area 25, and the drive train operating mode is adjusted accordingly. In doing so, the development over time of the population density or the people density can also be taken into account in order to plan a transition to the most suitable drive train operating mode in each case.

FIG. 3 shows a scenario in which the motor vehicle 30 is to travel from a starting location "A" to a destination "B". The motor vehicle 30 is equipped with a navigation system or a comparable device. The device according to the invention thus has available information both regarding the route of the vehicle and also regarding an estimation of the population density or the people density along the corresponding path of the vehicle based on the respectively detected number of individuals. Estimation zones along the route of the vehicle are denoted by "31"-"35", wherein each of said estimation zones 31-35 is associated with a respective center 31a, . . . , 35a. The estimation zones or areas 31, 32, and 33 are inner city areas in the representative scenario, whereas the areas 34 and 35 are non-urban areas.

In the representative embodiment of FIG. 3, a measurement now takes place of the average population density or people density at the start and end of the inner-city area, i.e. for the (estimation) areas 31 and 33. Here a first strategy for reducing emissions in said areas 31 and 33 is activated by the device. In area 32 however, in the representative embodiment a second strategy is activated that provides a still stricter emission limit (for example by enforcing an electric drive mode), because the population density or the people density is relatively higher or very high there. Finally, for areas 34 and 35 a very low people density and dynamics are measured or anticipated, so that the device enables a return to a relatively conventional drive train operating mode, wherein for said areas special operating modes, such as for example the regeneration of a diesel particle filter (DPF), may also be able to be planned.

In further embodiments, the number of emission sources present in a current estimation area can also be monitored by the device according to various embodiments. Said number of emission sources can also be taken into account in the decision regarding whether a change of the drive train emission mode is to be carried out or not. Emission sources can for example be other motor vehicles, but also industrial manufacturing plants or power stations with the use of fossil fuels, airports etc. The detection of such emission sources can for example be carried out based on GPS. In doing so, according to the invention the density of emission sources for the individual estimation areas can also be estimated. The corresponding decision function for altering the drive train modes increases in complexity here, wherein for example reducing emissions (for example by switching on the electric drive) can be caused if there is a high density of emission sources despite a low population density or people density.

In one or more embodiments, operating modes for reducing the emissions of a motor vehicle are planned and activated based on a possible dynamic estimation of the population density or the people density. The device according to the invention comprises for this purpose a device for locating the motor vehicle as well as a device for planning the route of the vehicle, for example in the form of a navigation system. The device according to the invention plans corresponding estimation areas in which the population density or the people density is estimated or analyzed. Furthermore, the device according to the invention determines in each case a suitable operating mode of the drive train for reducing emissions that enables emissions to be minimized in a certain estimation area and activates said operating mode.

The planned estimation areas according to the invention can be constant regarding the characteristic features thereof (such as shape or size) or can even vary depending on the vehicle state (for example the speed of the vehicle) or the surroundings of the vehicle (for example an inner-city area, freeway, non-urban area etc.).

The frequency at which a respective new estimation area is planned can also be constant or even vary depending on the vehicle state (for example the speed of the vehicle) or on the surroundings of the vehicle. The estimation areas along the route of the vehicle can be planned if said route is fully or partially known or can easily be predicted.

The estimation of the population density or the people density can be carried out by geographical location of all persons or individuals present within an estimation area. The number of individuals detected within the respective estimation area over the entire surface of the estimation area can be used as a measure of the population density or the people density. Furthermore, the dynamics of the population density or the people density can be estimated and the orientation and speed of motion of the individuals detected within the respective estimation area can be determined or estimated.

The determination according to the invention of which operating mode is most suitable for reducing emissions for a predetermined estimation area can be carried out regarding the population density or the people density, the population dynamics or the people dynamics, the period spent by the motor vehicle in the relevant estimation area, the weather or environmental conditions in the relevant estimation area (for example regarding the air circulation and the emission dissipation), the estimated emissions in the current operating mode in said estimation area, the energy expenditure and time expenditure for exiting the current operating mode and for a transition to a predetermined emission reducing strategy and the current emission value in the relevant estimation area. With a knowledge of the route of the vehicle, planning of the optimum combination of emission reduction modes that enable maximum emission reduction is carried out, wherein the load on the vehicle and the energy costs are minimized at the same time.

In further embodiments, monitoring of the number of emission sources in each estimation zone as well as the determination of a category of the relevant emission source (for example motor vehicle, truck, factory, airport etc.) can be carried out. The detection of the respective emission sources can for example be carried out based on GPS. The number of emission sources as well as the category thereof (regarding the respective degree of emissions) can be taken into account in the decision regarding whether the operating mode of the drive train is to be altered or not.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A method for operating a vehicle having different operating modes affecting emissions, comprising:
   activating, by a vehicle controller, at least one of the different operating modes affecting emissions selected in response to an estimated population density of a designated area associated with a current location or an anticipated future location of the vehicle, wherein the estimated population density is based on smartphone-based positions and velocity vectors of people within a specified estimation area.

2. The method of claim 1 further comprising repeatedly estimating the population density by the vehicle controller while the vehicle is moving, wherein the designated area for which the population density is estimated is updated based on a current position of the vehicle.

3. The method of claim 1 wherein the anticipated future location is anticipated in response to a destination or route received by a navigation system of the vehicle.

4. The method of claim 1 wherein the vehicle comprises a hybrid vehicle and the different operating modes comprise an electric mode.

5. The method of claim 4 further comprising selecting the electric mode in response to the population density exceeding a threshold population density.

6. The method of claim 1 further comprising selecting one of the different operating modes in response to air quality of the current location or the anticipated future location.

7. The method of claim 1 further comprising selecting one of the different operating modes based on respective energy expenditure associated with the one of the different operating modes relative to other of the operating modes.

8. The method of claim 1 further comprising selecting one of the different operating modes in response to a number or type of emission sources present in the current location or the anticipated future location.

9. A vehicle having a plurality of operating modes including an electric mode, comprising:
   a controller programmed to control the vehicle according to one of the plurality of operating modes selected in response to a population density of a location of the vehicle, the population density estimated by the controller responsive to smartphone-based geographical location data including positions and velocity vectors of persons located within a predetermined estimation area.

10. The vehicle of claim 9 wherein the controller is further programmed to select the electric mode in response to a first population density and a different operating mode in response to a second population density higher than the first population density.

11. The vehicle of claim 9 wherein the controller is further programmed to select one of the plurality of operating modes in response to an air quality of the location.

12. The vehicle of claim 9 wherein the location comprises a location on a vehicle route programmed into a navigation system.

* * * * *